Dec. 19, 1933.  A. W. WORRELL  1,939,939
COFFEE DISPENSER
Filed Dec. 15, 1931
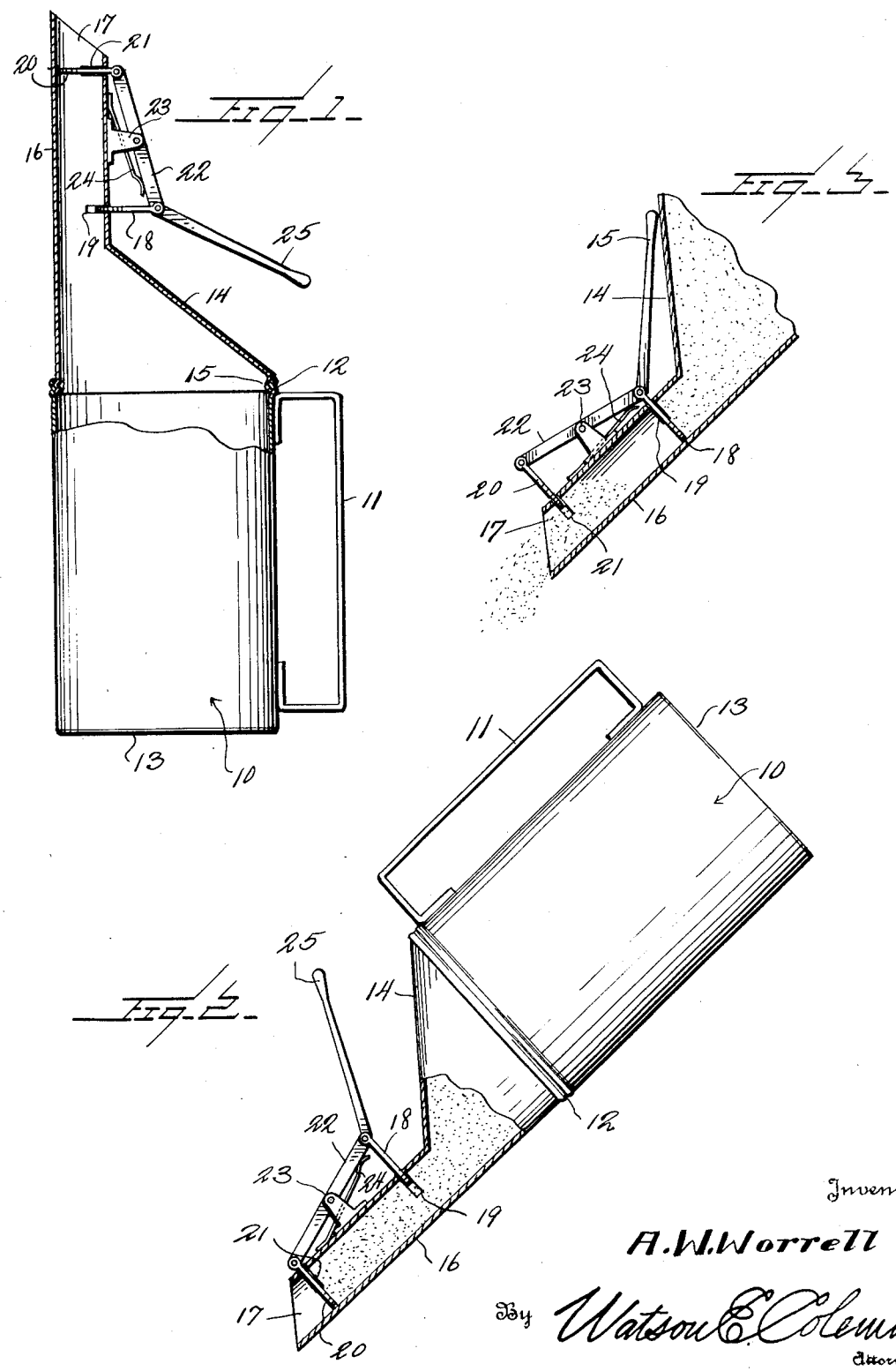

Patented Dec. 19, 1933

1,939,939

UNITED STATES PATENT OFFICE 1,939,939

COFFEE DISPENSER

Arthur William Worrell, St. Joseph, Mo.

Application December 15, 1931
Serial No. 581,207

4 Claims. (Cl. 221—112)

This invention relates to dispensing devices, and more particularly to a device adapted for use in the dispensing of dry or ground particles in the form of ground coffee or the like.

An object of this invention is to provide a measuring device by means of which a suitable quantity of ground material may be withdrawn from a suitable receptacle without opening the receptacle for the admission of air, which would have a tendency to permit the article to deteriorate.

The above and various other objects and advantages of this invention will in part be described in and in part be understood from the following detailed description of the present preferred embodiment, the same being illustrated in the accompanying drawing, wherein:—

Figure 1 is a detail side elevation partly in section of a device constructed according to the preferred embodiment of this invention;

Figure 2 is a similar view but showing the method of removing the material from the receptacle;

Figure 3 is a fragmentary sectional view showing the novel measuring means by which the material is removed from the receptacle in a measured quantity.

Referring to the drawing wherein like numerals of reference designate corresponding parts throughout the several views, the numeral 10 designates generally a cylindrical receptacle which has one end portion 13 thereof closed and the other end 12 provided with threads for receiving a cover or closure member. A looped handle 11 is secured to the outer surface of the receptacle 10 and extends longitudinally thereof.

A substantially funnel-shaped member 14, which is provided at the base portion thereof with threads 15, is threadably mounted on the threaded portion 12 of the receptacle 10 and the apex or reduced portion of the funnel-shaped member 14 terminates in a tubular measuring member 16. This tubular measuring member 16 has a spout 17 at the outer end thereof for the purpose of pouring the material passing through the interior of the member 16.

An inner closure member 18 is slidably mounted in a guide opening 19 provided in the chute or tubular member 16 adjacent the inner end thereof, and an outer closure member 20 is slidably mounted in a guide opening 21 adjacent the outer end of the measuring tube 16. These closure members 18 and 21 are connected together for simultaneous movement by means of a rock lever 22 which is rockably mounted on a standard 23 carried by the periphery of the measuring tube 16. A spring 24 is secured at one end to the tube 16 and engages against the inner end of the rock lever 22 so as to constantly urge the inner end upwardly and the outer closure member 20 inwardly of the tube 16 into closed position.

A handle or operating member 25 is formed with the rock lever 22 and extends at an obtuse angle therefrom so that when the lever 22 has the inner end thereof rocked toward the tube 16, the free end of the operating handle or lever 25 will be disposed closely adjacent the wall of the funnel-shaped member 14, as more clearly disclosed in Fig. 3. The closure members 18 and 20 are spaced apart a desired distance so that the material within the tube 16 between these two closures will be a predetermined quantity and in the present instance, the quantity may be a sufficient quantity for the making of one or more cups of coffee.

In the operation of this device, the ground coffee may be placed within the reservoir or receptacle 10 by unscrewing the top 14. When the coffee or other ground material has been placed in the receptacle 10, the measuring top may be threaded thereon and the device tilted downwardly at an angle, as disclosed in Fig. 2 by grasping the handle 11 in one hand. The operating lever 25 will be held in upraised position by means of the spring 24 which will maintain the outer closure member 20 in closed position and permit the material in the receptacle 10 to flow downwardly into the tube 16 for contact with the outer closure member 20. When it is desired to remove the material from the measuring tube 16, the operating handle 25 may be rocked on the standard 23 toward the cap 14 so as to swing or move the inner closure member 18 into closed position across the measuring tube adjacent the inner end thereof, thereby preventing the passage of additional material through the tube 16 when the device is tilted. Simultaneously with the movement of the inner closure member 18 into closed position, the outer closure member 20 is drawn outwardly of the measuring tube 16 and releasing the material disposed between the two closure members 18 and 20 for discharge through the discharge nozzle 17.

It will be noted, from the foregoing, that a measured quantity of dry material in the form of coffee or other similar material will be discharged from the measuring tube 16 upon each rocking movement of the operating lever 25 toward the cap or funnel-shaped member 14. This member 14 is shaped so as to lead the material toward the measuring tube 16 and preferably the longitudinal axis of the measuring tube 16 is disposed in a direction substantially parallel with the side wall of the receptacle 10 although I, of course, do not wish to be limited to this particular construction as the measuring tube 16 may be disposed on any desired angular relation with respect to the longitudinal axis of the receptacle 10.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. A dispensing means comprising a container open at one end, a substantially funnel shaped cap for the container, means for removably mounting the cap on the container, one portion of the cap wall being substantially in alinement with the adjacent wall of the container, a discharge tube carried by the cap and having a portion alining with said one cap portion, a pair of plates slidable transversely of the tube, and means for moving said plates one reversely from the other.

2. A dispensing means comprising a container open at one end, a substantially funnel shaped cap for the container, means for removably mounting the cap on the container, one portion of the cap wall being substantially in alinement with the adjacent wall of the container, a discharge tube carried by the cap and having a portion alining with said one cap portion, a pair of plates slidable transversely of the tube, means for moving said plates one reversely from the other, and a bail secured to the side wall of the container and extending in a direction parallel with said discharge tube.

3. A dispensing means comprising a container open at one end, a substantially funnel-shaped cap for the container, a flange carried by the cap and engaging the container to removably mount the cap on the container, one portion of the container wall being substantially in alinement with the adjacent wall of the container, a discharge tube carried by the cap and having a portion alining with said one cap portion, a pair of plates slidable transversely of the tube, and means for moving said plates one reversely from the other.

4. A dispensing means comprising a container open at one end, a substantially funnel shaped cap for the container, a threaded flange carried by the cap and engaging the container to removably mount the cap on the container, one portion of the cap wall being substantially in alinement with the adjacent wall of the container, a discharge tube carried by the cap and having a portion alining with said one cap portion, a pair of plates slidable transversely of the tube, and means for moving said plates one reversely from the other.

ARTHUR WILLIAM WORRELL.